United States Patent [19]

Bond et al.

[11] Patent Number: 4,504,232
[45] Date of Patent: Mar. 12, 1985

[54] BATTLEFIELD FRIEND OR FOE INDENTIFICATION TRAINER

[75] Inventors: Gary M. Bond; Albert H. Marshall, both of Orlando, Fla.

[73] Assignee: The United States of America as represented by the Secretary of the Navy, Washington, D.C.

[21] Appl. No.: 471,942

[22] Filed: Mar. 3, 1983

[51] Int. Cl.³ .............................................. F41G 3/26
[52] U.S. Cl. ........................................ 434/11; 434/21; 434/335
[58] Field of Search .................................... 434/16–22, 434/11, 335; 273/348.1

[56] References Cited

U.S. PATENT DOCUMENTS

| | | | |
|---|---|---|---|
| 3,798,796 | 3/1974 | Stauff et al. | 434/20 |
| 4,290,757 | 9/1981 | Marshall et al. | 434/22 |
| 4,340,370 | 7/1982 | Marshall et al. | 434/22 |
| 4,437,671 | 3/1984 | Busch | 434/19 |
| 4,439,156 | 3/1984 | Marshall et al. | 434/20 |
| 4,470,818 | 9/1984 | Marshall | 434/22 |

Primary Examiner—Richard C. Pinkham
Assistant Examiner—Leo P. Picard
Attorney, Agent, or Firm—Robert F. Beers; Robert W. Adams

[57] ABSTRACT

An apparatus for training students in thermal image recognition provides a plurality of variable thermal images for viewing through telescopic sights at a plurality of student stations. Identification of the image is electronically evaluated for correctness and response time by a microcomputer, located at an instructor station, which controls displays indicative of the student's performance.

20 Claims, 5 Drawing Figures

BATTLEFIELD FRIEND OR FOE INDENTIFICATION TRAINER

BACKGROUND OF THE INVENTION

The present invention relates to training devices and in particular to training devices for weapons operators. More particularly, the present invention may be described as a training device for aiding weapons operators in identifying thermal targets as friend or foe.

Armed conflict is a sophisticated technological confrontation, with the protagonists pitting their best against one another. Toward this end, all-weather warfare has developed such that technology has given weapons operators the ability to "see" through darkness, haze, smoke, or other atmospheric obscuration. The images which these operators "see" are the infrared signatures given off due to the thermal emissions of equipment and personnel. Those images do not exactly correspond to the optical images normally detected by the eyes; therefore, the weapons operator must be trained to discern between the thermal images and make judgment as to whether the source of the image is friend or foe.

Previous training efforts have used a number of concepts ranging from the source itself as a target to pyrotechnic devices emulating the thermal image. With the increasing cost of practice ranges and full scale targets, miniaturization and modeling of the target area are most advantageous.

The present invention meets the needs of the armed services by providing an economical training system which can give a battlefield scenario within a limited, room size, space while providing a qualitative measure of a trainee's performance to an instructor.

SUMMARY OF THE INVENTION

It is an object of the present invention to present a training scenario in which selected IR signature targets may be engaged by a trainee.

Another object of the invention is to provide an instructor with a rapid and accurate measure of the trainee's ability to identify and classify thermal signatures.

Yet another object of the invention is to provide a trainee with a variety of thermal signature targets in a simulated combat arena at a low cost and low risk level.

These and other objects are accomplished by the present invention which provides a modelboard trainer on which pseudo-thermal targets may be located by an instructor. The pseudo-thermal targets are viewed through a simulated IR sight by the student or trainee, who must signify whether the signature is of a friend or foe. The student's identification of the signature is stored electronically and compared to the input by the instructor for correctness. The instructor may utilize the invention with several trainees simultaneously.

The features of the invention desired to be protected are set forth in the appended claims. The invention itself, together with further objects and advantages thereof, may best be understood by referring to the following description taken in conjunction with the appended drawings.

DESCRIPTION OF THE PREFERRED EMBODIMENT

Figure 1:
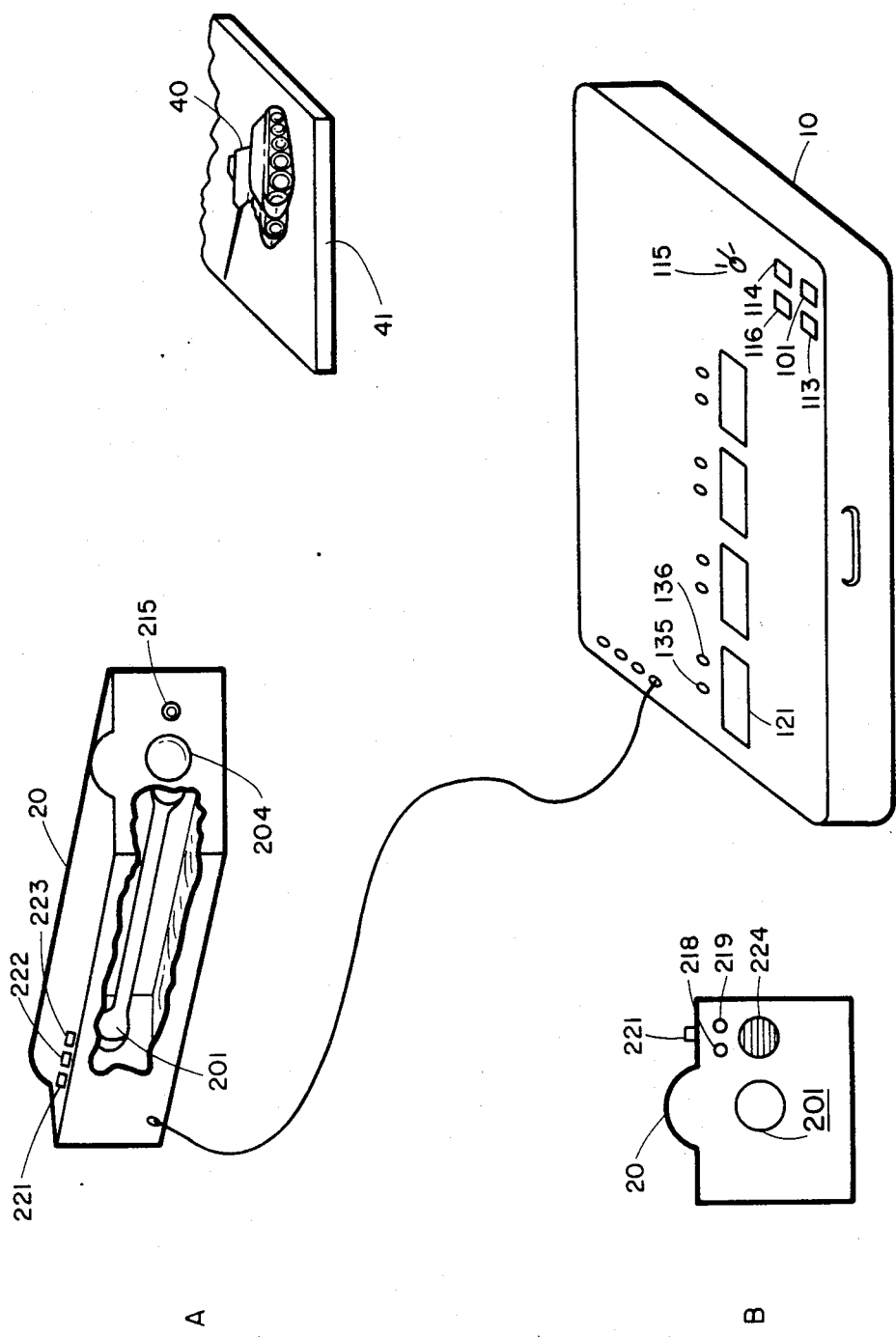
FIG. 1A is a block diagram representation of the invention.
FIG. 1B illustrates the face plate of the student station.

The Battlefield Identification Friend/Foe (BIFF) training device is a microcomputer controlled system for presenting a realistic battlefield scenario to a group of trainees attempting to distinguish between the thermal imagery presented by friend or enemy vehicles. Reference to FIG. 1A gives an overview to the training concept wherein an instructor station 10 is able to monitor a plurality of student stations 20. In the exemplary model herein presented, four stations 20 will be assumed although each of the four identical stations will not necessarily be shown in the drawings.

Figure 2:
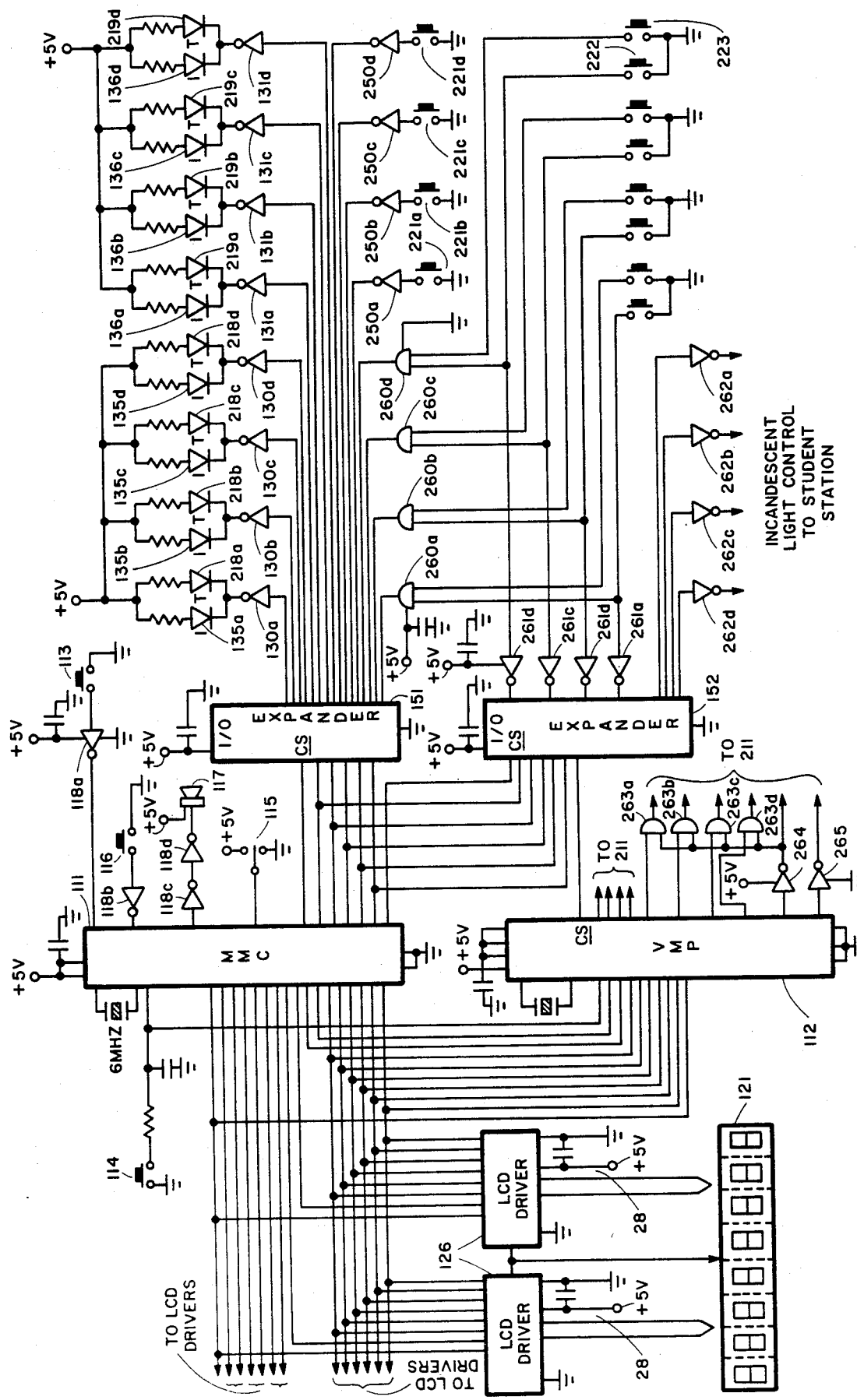
FIG. 2 is a schematic representation of the circuitry of the instructor station.

Referring to FIG. 2, a main microcomputer 111 is connected to a 6 mhz crystal oscillator 90 and of course properly connected to a voltage source via switch 101 of FIG. 1A, and ground, as will be hereinafter assumed to be true for all components. Microcomputer 111 is connected to output data and control signals to a pair of liquid crystal display (LCD) drivers 126 and 127 for each student station monitored. Each set of drivers 126 and 127 is operably connected to an LCD 121, also shown in FIG. 1.

Microcomputer 111 is also connected to simultaneously output the data to a voice microprocessor (VMP) 112. A reset switch 114, also shown in FIG. 1, is connected in a typical manner to provide a reset input to microcomputer 111 and VMP 112 simultaneously.

Microcomputer 111 is connected through an inverter 118 to "start" switch 113, via inverter 118b to "score" switch 116 and directly to friend or foe "selection" switch 115, all of said switches appearing in FIG. 1 as well. Microcomputer 111 is also connected via inverters 118c and 118d to a sonalert 117. Microcomputer 111 is connected to a first input/out (I/O) expander 151 and a second I/O expander 152.

I/O expander 151 is connected to light emitting diode (LED) drivers 130a to 130d. Each LED driver 130 is connected to parallel green LED's 135a to 135d and 218a to 219d. Green LED's 135 are mounted on instructor station 10 in cooperative relation to LCD 121. Each green LED 218 is mounted on a student station 20 and is connected via connector 211 (not shown in FIG. 2) as will be illustrated in FIG. 3. In a like manner, I/O expander 151 is connected to red LED's 136a to 136d and 219a to 219d via drivers 131a to 131d, LED's 136 being mounted on instructor station 10 and LED's 219 being mounted on student station 20.

I/O expander 151 also is connected to receive input from "ready" switches 221a–221d, one of which is physically mounted on each station 20, via inverters 250a to 250d.

"Enemy" identification switches 223a–223d are mounted on student station 20 and connected to I/O expander 151 via connector 211 and select buffers 260a–260d. "Friend" identification switches 222a to 222d are likewise connected to I/O expander 151 and connected to I/O expander 152 via inverters 261a to 261d. I/O expander 152 also is connected to inverters 262a to 262d which are connected to connector 211. I/O expander 152 is also connected to the CS input of VMP 112.

VMP 112 is connected to the connector 211 as shown in FIG. 2. The inputs or outputs thus connected are busy/ready signals; strobe signals via gates 263a to 263d, reset and clock signals via inverter 264, and serial data via inverter 265.

Figure 3:
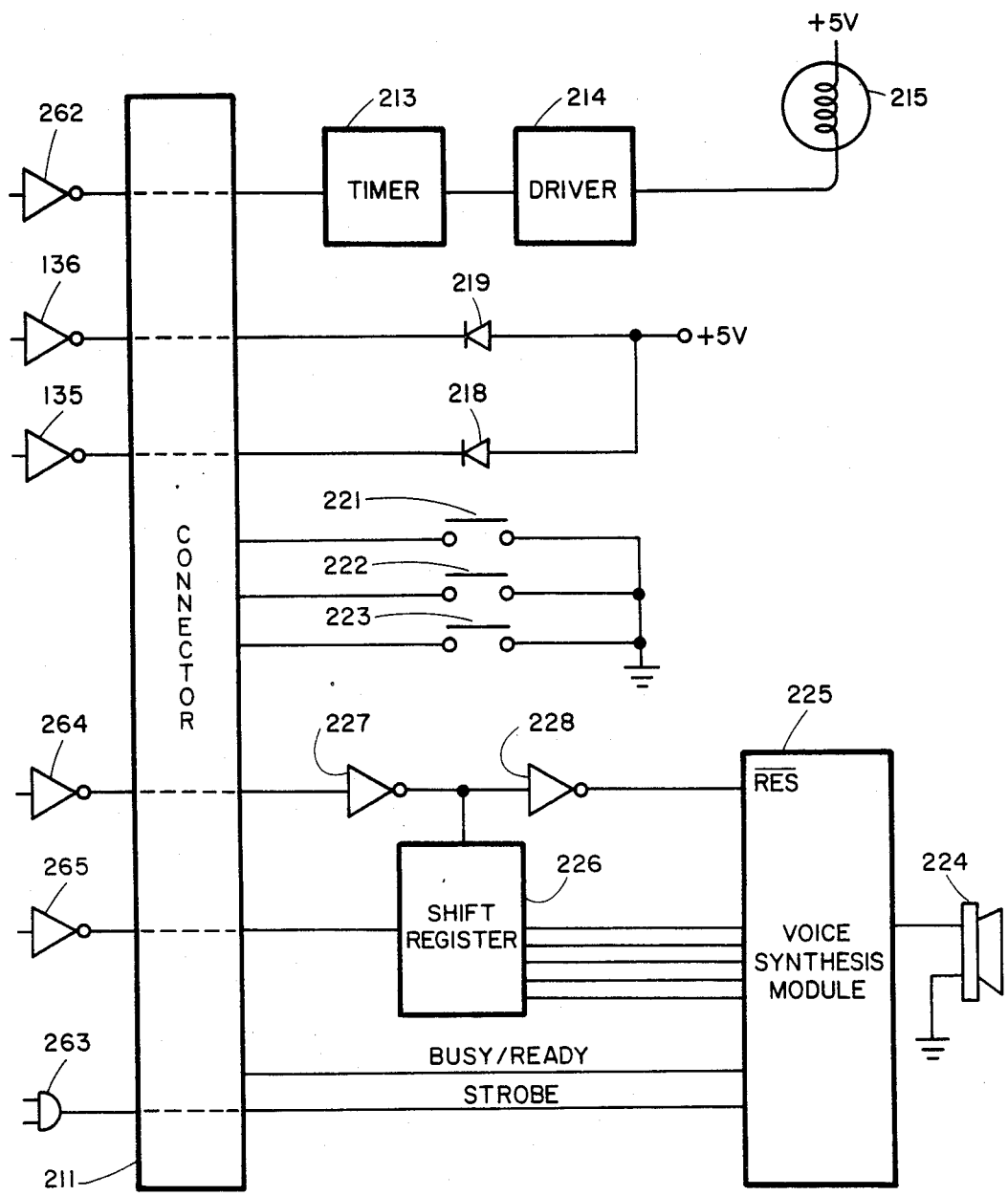
FIG. 3 is a schematic representation of the student station.

Reference to FIG. 3 will complete the circuitry of BIFF. Each student station 20 has therein a connector 211 previously referred to in the discussion of FIG. 2.

Connector 211 provides a signal path from inverter 262 of FIG. 1 to a timer 213 which in turn is connected to provide a signal to driver 214, which is operably connected to an incandescent lamp 215. Red LED 219 and green LED 218, shown in and described in relation to FIG. 2, are connected via connector 211, as are the three switches mounted on student station 20, "ready" switch 221, "friend" switch 222, and "enemy" switch 223.

The reset and clock output of VMP 112 is connected by connector 211 to a second inverter 227, the output of which is connected to the clock input of a shift register 226 and a second inverter 228, which is connected to the reset input of a voice synthesizer module (VSM) 225, the output of which is connected to a speaker 224. VSM 225 receives parallel data from shift register 226, which is connected to the serial data output of VMP 112 via connector 211. VSM 225 is also in electrical communication with VMP 112 for strobe and busy ready signals via connector 211.

As can be seen in FIG. 1A, lamp 215 is mounted on station 20 in such a manner that its illumination is directed along a path parallel and proximal the optical axis of a telescopic sight 201 which is an integral component of station 20. Sight 201 is positioned to view a miniature target 40 which has been painted with retroreflective paint and placed on a modelboard 41. Disposed along the optical path between lamp 215 and target 40 are a focusing lens 202, such as a 29 mm lens, and a red or green optical filter 203. Proximal telescope sight 201 is a miniscus lens 204.

Modelboard 41 may be of a variety of types, such as a portable folding version or a rotating version where the modelboard 41 is rotated about the axial shaft of a small, e.g., 7 rpm, DC motor 42, not shown. The rate of rotation can be controlled by a simple reostatic speed control 43 connected between motor 42 and a battery 44. A recharger 45 is provided for battery 44.

Although a number of selections may be made for the individual components of the BIFF, Table I identifies the components found to be operable in the exemplary model.

TABLE I

| Component | No. | Make |
| --- | --- | --- |
| Master Microcomputer | 111 | Intel 8748 |
| Voice Microprocessor | 112 | Intel 8741 |
| Inverters | Various | Fairchild 7404 |
| Buffers | Various | Fairchild 7400 |
| LCD's | 121 | Hamlin 3922-315-5 |
| LCD Drivers | 126 | Intersil ICM7211AM1PL |
| I/O Expanders | 151/152 | Intel 8243 |
| Timer | 213 | Fairchild 555 |
| Driver | 214 | Signetics 5503 |
| Shift Register | 226 | Fairchild 74164 |
| Voice Synthesis Module | 225 | General Instruments VSM 2032 |
| Telescopic Sight | 201 | 4X to 12X |
| Focusing Lens | 20 | 29 mm |

TABLE I-continued

| Component | No. | Make |
| --- | --- | --- |
| DC Motor | 42 | 7 rpm, 12 volt |

In operation, an instructor selects a target 40, which is one of a plurality of miniature models which have been painted with retroreflective paint in patterns corresponding to the thermal emission of friendly or enemy vehicles, as further explained by the application of Albert H. Marshall, U.S. Ser. No. 433,580, dated Oct. 12, 1982. The instructor places target 40 on model board 41 and darkens the training room, if not previously darkened. He then enters the identification of target 40 into master microcomputer 111 via switch 115 located on instructor station 10 and begins the training exercise by depressing start switch 113, also located at instructor station 10. Although a modelboard type exercise has been described, it should be understood that the invention may be used with any form of pseudo-thermal image presentation which admits its use.

Figure 4:
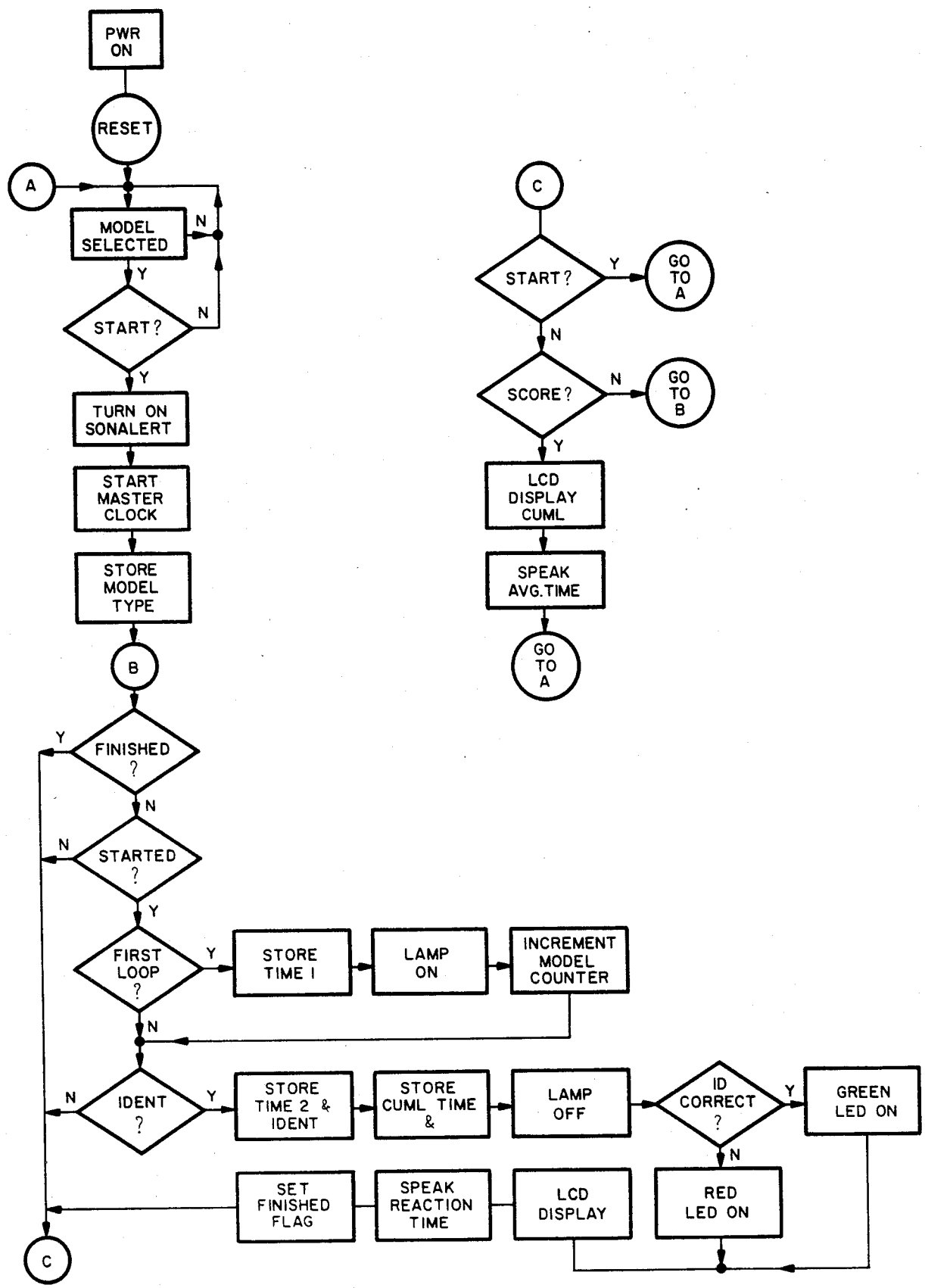
FIG. 4 is a flow chart of the operation of the invention.

The remainder of the training exercise may be most clearly understood by reference to FIG. 4, wherein the procedure is set out in flow chart form. As can be seen from FIG. 4, computer 111 is reset when initial power is supplied. Thereafter computer 111 interrogates to determine the instructor inputs, i.e., has start button 113 been depressed and has target 40 been identified via switch 115. When these conditions have been met, sonalert 117 is sounded for one second to alert the trainees that the exercise is beginning. The master clock is started and the model type, friend or foe, is stored for later use.

Loop B is iterated for each student throughout the exercise. The first time through the loop the trainee's starting time is stored, his incandescent lamp 215 is turned on, and an individual model counter is incremented. The first cycle through the loop after the student identifies target 40 as friend or foe, his end time is stored and the identification is stored; his cumulative time and identification is stored, and his incandescent lamp is turned off. If he has correctly identified target 40, green LED 218 at his station 20 is illuminated and a green LED 135 corresponding to his station is illuminated on station 10. If incorrect identification is made, red LED 219 at station 20 and red LED 136 at station 10 are illuminated. In either event, LCD 121 outputs the students reaction time and his correctness, i.e., one of one, zero of one, one of two, two of two, zero of two, and so on.

Inasmuch as the student does not have an LCD at station 20, he is given an auditory report on his reaction time via VMP 112, VSM 225 and speaker 224 mounted at station 20.

Internally, computer 111 sets the trainee finished flag for each student in response to the student's identification of the target. The instructor may then choose to repeat the exercise by pressing start switch 113, or he may choose to score the data accumulated over the past iteration of the training cycle. When score switch 116 is closed, LCD 121 presents the average reaction time for the student based on the total time elapsed and the number of iterations. Speaker 225 provides the same data to the student. Obviously, selecting reset switch 114 dumps all stored data and returns to the initial conditions.

It can readily be seen from the foregoing that the BIFF system is a most useful improvement in the area of weapons operation training. It should also be clearly apparent to those skilled in the art that the invention has been described by way of illustration, rather than limitation, and that numerous substitutions, modifications, additions, and other changes not specified may be made which fall within the scope and the spirit of the appended claims.

What is claimed is:

1. An apparatus for training students in identification of thermal signatures comprising in combination:
   means for presenting pseudo-thermal images;
   means for viewing said images in a manner which simulates a thermal sight;
   means for electronic identification of said images by students as representative of a friend or foe, having an output;
   means for scoring said identification in terms of elapsed time and correctness, operably connected to receive input from said identification means and having a plurality of inputs and outputs; and
   means for displaying said time and correctness operably connected to said scoring means.

2. The apparatus of claim 1, wherein said presenting means comprises:
   a plurality of miniature models, each having painted thereon with retroreflective paint a thermal pattern characteristic of the actual vehicle represented by the model;
   a terrain board for positioning said models thereon; and
   a light source directed toward said models and located proximal said viewing means.

3. The apparatus of claim 1 wherein said viewing means comprises:
   an optical telescope;
   a housing containing said telescope; and
   filter means for providing coloration to light entrant said telescope.

4. The apparatus of claim 1 wherein said scoring means comprises:
   a programmable microcomputer having a memory and a plurality of inputs and outputs including an input from said identification means and an output to said displaying means; and
   means for inputing identification data about said images into said microcomputer for comparison with the input from said identification means.

5. An apparatus for training students in the identification of thermal signatures comprising, in combination:
   means for presenting pseudo-thermal images;
   a student station from which said student may view said images and electronically identify same;
   means at said student station for viewing said images in a manner which simulates a thermal sight;
   an instructor station from which an instructor may monitor one or more students' performance; and
   an electrical circuit having the capability to provide performance measurement data based on inputs from said instructor and said student operably connected between said student station and said instructor station.

6. The apparatus of claim 5 wherein said presenting means comprises:
   a plurality of miniature models, each having painted thereon with retroreflective paint a thermal pattern characteristic of the actual vehicle represented by the model;
   a terrain board for positioning said models thereon; and
   a light source directed toward said models and located proximal said viewing means.

7. The apparatus of claim 5 wherein said student station comprises:
   an optical telescope;
   a housing for said telescope; and
   selection means mounted on said housing for identifying said image as friend or foe, operably connected to provide an electrical input to said circuit means.

8. The apparatus of claim 7 wherein said student station further comprises:
   means for inputting a start signal to said circuit, mounted on said housing;
   means for indicating performance to said student mounted on said housing and receiving input from said circuit.

9. The apparatus of claim 8 wherein said indicating means comprises:
   a red light emitting diode and a green light emitting diode, both of said diodes operably connected to said electrical circuit such that only one may be illuminated in response to said student's performance.

10. The apparatus of claim 9 wherein said indicating means further comprises an audio speaker for outputting said student's reaction time data in a spoken language, operably connected to receive said data from said electrical circuit.

11. The apparatus of claim 5 wherein said instructor station comprises:
    means for visually presenting said student's performance, receiving input from said electrical circuit;
    means for inputting data into said circuit indicating the identity of said image;
    means for inputting a start signal to said electrical circuit;
    means for inputting a reset signal into said circuit; and
    means for inputting a cumulative score signal to said circuit.

12. The apparatus of claim 11 wherein said presenting means comprises:
    a liquid crystal display (LCD) operably connected to said electrical circuit to output data received therefrom; and
    a red light emitting diode (LED) and a green light emitting diode (LED), both of said diodes conjuncturally positioned with said LCD and connected to said circuit such that only one of said LED's is illuminated in response to said student's performance.

13. The apparatus of claim 5 wherein said circuit comprises:
    a programmable microcomputer having the capability to store and compare data in accordance with predetermined instructions, having a plurality of inputs and outputs including: inputs from said student station indicating target identification and training commencement; input from said instructor station indicating image data and control instructions; outputs to said student station indicating performance; and outputs to said instructor station indicating performance.

14. The apparatus of claim 13 wherein said circuit further comprises at least one input/output expander operably connected between said microcomputer and said stations.

15. The apparatus of claim 13 wherein said circuit further comprises:
   a voice microprocessor operably connected to receive performance data from said microcomputer and having outputs to each student station;
   a shift register located at each student station for receiving data from said output of said voice microprocessor, having an output; and
   a voice synthesis module located at each student station, operably connected to receive data from said shift register and to output audio in accordance therewith.

16. The apparatus of claim 13 wherein said circuit further comprises:
   means for providing an audio signal operably connected to said microcomputer and controlled thereby; and
   lamp means operably connected to said microprocessor and illuminated in response to inputs from said student station.

17. An apparatus for training students in thermal image recognition, comprising in combination:
   means for presenting pseudo-thermal images;
   a student station for viewing said images, said student station having as one component thereof an optical telescope;
   an instructor station for monitoring the performance of at least one student;
   a microcomputer having the capability to store and compare data in accordance with predetermined instructions, having a plurality of inputs and outputs;
   means for connecting said microcomputer to a power supply, said connecting means mounted on said instructor station;
   first input means operably connected to said microprocessor for inputting identification data about said image;
   second input means operably connected to said microprocessor for initiating said predetermined instructions;
   third input means operably connected to said microcomputer for resetting same;
   fourth input means operably connected to said microcomputer to initiate further predetermined instructions, all of said first through fourth inputting means being mounted on said instructor station;
   fifth input means operably connected to said microcomputer for indicating student exercise commencement;
   sixth input means operably connected to said microcomputer for indicating student identification of said image as friendly;
   seventh input means operably connected to said microprocessor for indicating student identification of said image as foe, each of said fifth through seventh input devices being physically mounted on said student station;
   first display means operably connected to receive an output from said microcomputer indicative of said student's performance, said display means being mounted on said instructor's console;
   first input/outut expander operably connected between said microcomputer and said fifth and sixth input means;
   second input/output expander operably connected between said microcomputer and said seventh input means;
   second display means operably connected to said microcomputer via said first input/output expander, providing performance data at both said student station and said instructor station.

18. The apparatus of claim 17 further comprising:
   a voice microprocessor operably connected to receive data from said microcomputer and having an input from said second input/output expander and having a plurality of outputs;
   a shift register located at said student station, receiving data from the output of said voice microprocessor, and having a plurality of outputs;
   a voice synthesis module receiving data from said shift register, having an output; and
   a speaker receiving signals from the output of said voice synthesis module and outputting spoken words in accordance therewith.

19. The apparatus of claim 17 wherein said image presenting means comprises:
   a plurality of miniature models, each painted with retroreflective paint such that said paint reflects light as a pseudo-thermal image, and a terrain board for positioning said models thereon, said apparatus further comprising:
   a timer operably connected to said second input/output expander to receive a trigger pulse from said microprocessor upon the input of data from said fifth input means, said timer having an output;
   a driver having an input connected to the output of said timer and having an output; and
   a lamp having an input from said driver, outputting light directed generally parallel to the optical axis of said telescope, said lamp being located proximal said telescope on said student station and said timer and driver being housed within said student station.

20. The apparatus of claim 17, further comprising individual interfaces within said student station for connecting said microcomputer therewith.

* * * * *